INVENTOR
JOSEPH C. THORNWALL

BY John C. Coy
Carl Levy

ATTORNEYS

United States Patent Office 3,427,525
Patented Feb. 11, 1969

3,427,525
REGULATED D.C. TO D.C. CONVERTER
Joseph C. Thornwall, Lanham, Md., assignor to the United States of America as represented by the Administrator of the National Aeronautics and Space Administration
Filed Nov. 3, 1966, Ser. No. 591,930
U.S. Cl. 321—2    9 Claims
Int. Cl. H02m 3/14, 3/32

ABSTRACT OF THE DISCLOSURE

A power supply for providing a regulated D.C. voltage to a fixed or variable load from an unregulated D.C. voltage source. The load voltage regulation is achieved by employing a switching means to alternately clamp and release a transformer-coupled regenerative blocking oscillator. The clamping and releasing rate required to achieve output voltage regulation is determined by the relative magnitude of the input and output voltages and by the power required by the load. As the load increases, the switching means will release the blocking oscillator more often; and the oscillator rate will increase by the correct amount to hold the output voltage constant. Energy is transferred directly from the source to the load during the direct or regenerative portion of the blocking oscillator cycle and also during the collapsing flux portion of the cycle.

---

The invention described herein may be manufactured and used by or for the Government of the United States of America for governmental purposes without the payment of any royalties thereon or therefor.

The present invention relates to efficient regulated D.C. to D.C. converters for use in low power electrical systems having space applications and, more particularly, to such converters in which there is a D.C. voltage output which is regulated against variations in the D.C. voltage input, load current, temperature effect, and other usual circuit variants.

In the prior art regulated D.C. to D.C. converters, power is continually consumed and has its minimum value determined, to a large extent, by the size of the magnetic cores used in the transformer coupling circuits. Since, by necessity, the magnetic cores, of the transformers are rather large, power losses, in low power applications, create a problem. In addition, to achieve regulation, power dissipating elements or pulse width control means are required. These also consume power. Accordingly, these systems are not ideally suited, because of their low efficiency, for the low power requirements in space applications.

It is therefore one object of the present invention to provide an efficient, low power drain, regulated D.C. to D.C. converter.

It is another object of the present invention to provide a regulated D.C. to D.C. converter in which the switching rate of the transformer-coupled oscillator functions to automatically compensate for variations in the input voltage and/or the load demands.

It is a further object of the present invention to provide a regulated D.C. to D.C. converter capable of utilizing a transformer having a relatively small core volume and wherein power dissipation losses are kept at a minimum.

These objects have been attained by a novel regulated D.C. to D.C. converter which requires only a small magnitude standby power and wherein the main operating portion thereof consumes power for a limited time rather than continuously. A transformer-coupled oscillator portion of the converter, having a voltage applied thereto from an input voltage source, is controlled by a switching means in accordance with the voltage level on the load. By the use of this switching means the transformer-coupled oscillator functions only at such time as when the level of load voltage drops below a predetermined value. More particularly, a comparator circuit, for example, a differential amplifier, is used to compare the load voltage at the output of a smoothing filter, for example, a capacitor, with a reference voltage developed from the voltage from the input voltage source. The output from this comparator circuit is then used to control the switching means, which, in turn cooperates with the transformer-coupled oscillator such that the transformer-coupled oscillator operates only at such time as when the load voltage is below the predetermined value. Another feature of this invention is the use of a diode in the output circuit of the transformer-coupled oscillator to enhance the efficiency of the converter.

The above and other objects and advantages of the invention will become more apparent upon full consideration of the following detailed description and accompanying drawings in which.

Figure 1:
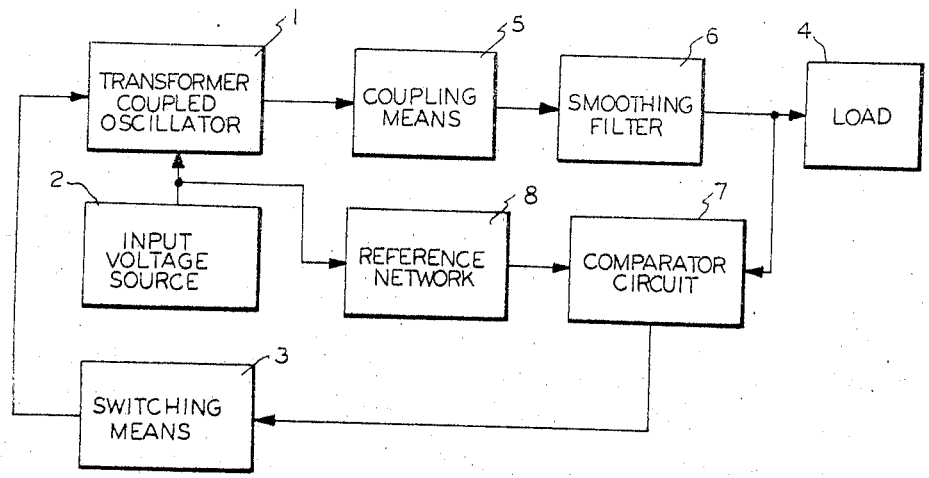
FIGURE 1 is a block diagram of the invention.

Now, referring to FIGURE 1, there is shown a regulated D.C. to D.C. converter system comprising a transformer-coupled oscillator 1 having connected thereto an input voltage source 2 and a switching means 3. The output from transformer-coupled oscillator 1 is applied to load 4 after first passing through coupling means 5 and smoothing filter 6. These latter two circuits perform essentially as a voltage storage means. The output from smoothing filter 6, a substantially D.C. voltage, in addition to being applied to load 4, is coupled to comparator circuit 7. Also coupled to comparator circuit 7 is the output from reference network 8, this network deriving its output from input voltage source 2. The output from comparator circuit 7 is used to control switching means 3 which, in turn, is connected to transformer-coupled oscillator 1.

Initially, with an input voltage from input voltage source 2 being applied to both transformer-coupled oscillator 1 and reference network 8, there is developed at the input of load 4 a substantially D.C. voltage. This is accomplished, as will be described in more detail hereinafter, by the action of transformer-coupled oscillator 1, coupling means 5, and smoothing filter 6 (the latter two circuits functioning essentially as a voltage storage means). The D.C. voltage developed at the input of load 4 is also coupled to comparator circuit 7, which, in addition, has a reference voltage from reference network 8 coupled thereto. At such time as the voltage being applied from smoothing filter 6 to load 4 approaches a predetermined value somewhat greater in magnitude than the value of the reference voltage from reference network 8, there is developed an output signal from comparator circuit 7. The application of this output signal to switching means 3 causes it to close, thereby preventing any further signal from being produced at the output of transformer-coupled oscillator 1, i.e., operation of the transformer-coupled oscillator is terminated. In essence, comparator circuit 7 performs as a threshold detecting device.

By this action, the output from smoothing filter 6 is prevented from rising above the predetermined value of voltage. Now, as the output voltage from smoothing filter 6 decreases in magnitude, for example, because current is being drawn by load 4 and smoothing filter 6 is essentially disconnected from input voltage source 2, the load voltage eventually decreases below the value of the reference voltage. When this happens an output voltage from comparator circuit 7 causes switching means 3 to open. This allows transformer-coupled oscillator 1 to again operate to furnish an output signal from coupling means 5. In this manner, the predetermined voltage output from smoothing filter 6 is re-established and the D.C. voltage available to load 4 is maintained essentially constant.

The operation just described performs periodically to maintain the predetermined voltage at the input to load 4. Accordingly, not only is the voltage available to load 4 kept substantially constant, but, in addition, the efficiency of the converter is maximized.

Figure 2:
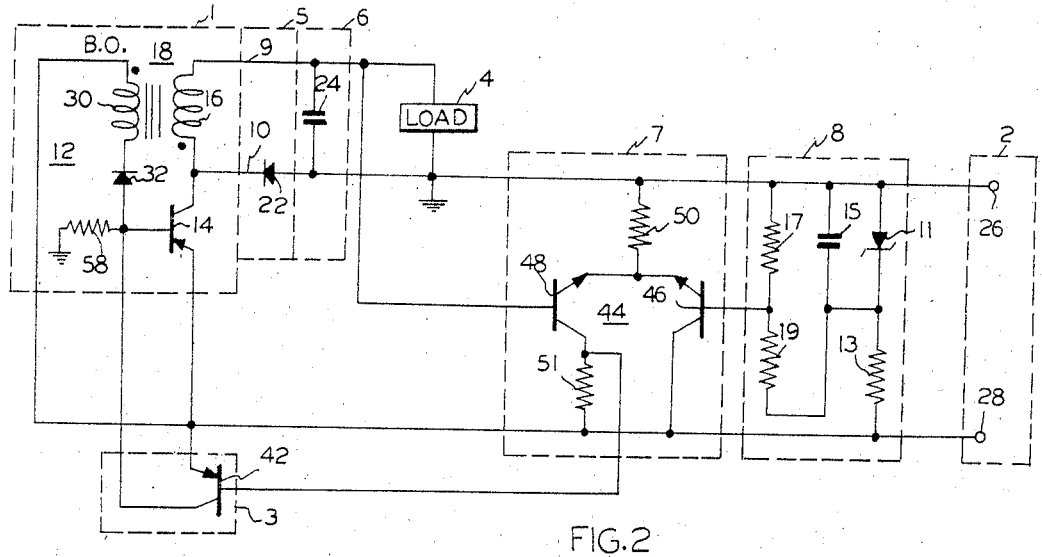
FIGURES 2 and 3 are schematic circuit embodiments of FIGURE 1 wherein the output voltage in each case is less than the input voltage and of the same and opposite polarity, respectively.

The preferred circuits and their interconnections for the regulated D.C. to D.C. converter of FIGURE 1 are shown in detail in FIGURE 2 for a converter providing a load voltage that is of the same polarity and of less magnitude than the input voltage. Transformer-coupled oscillator 1, in this example, comprises blocking oscillator 12; coupling means 5 essentially includes both diode 22 and output leads 9, 10 from blocking oscillator 12; smoothing filter 6 is capacitor 24; comparator circuit 7 is differential amplifier 44; reference network 8 includes Zener diode 11 and bias resistor 13 connected in series, capacitor 15 shunting Zener diode 11 and voltage divider resistors 17, 19 connected to the junction of Zener diode 11 and bias resistor 13; and switching means 3 comprises transistor 42.

Blocking oscillator 12 includes transistor 14, diode 32, bias resistor 58, and transformer 18. Transformer 18 has primary winding 16 and secondary winding 30. Secondary winding 30 is connected between one end of diode 32 and the emitter of transistor 14. The other end of diode 32, along with one end of bias resistor 58, is connected to the base of transistor 14, and the other end of resistor 58 is connected to ground. The collector of transistor 14 is connected to the junction of lead 10 and one end of primary winding 16. The other end of primary winding 16 is connected to lead 9.

Leads 9, 10 and diode 22, and smoothing filter capacitor 24 form a closed loop with primary winding 16, and load 4 shunts capacitor 24. Input terminals 26 and 28, of input voltage source 2, are connected to the junction of capacitor 24 and diode 22 (as a common ground) and to the emitter of transistor 14, respectively.

Voltage reference network 8 comprises bias resistor 13 and Zener diode 11 connected in series across terminals 26 and 28. Capacitor 15 and voltage divider resistors 17, 19 both shunt Zener diode 11. The junction of voltage divider resistors 17, 19 is connected to the base of transistor 46 of differential amplifier 44. Differential amplifier 44 also includes transistor 48, common emitter resistor 50, and collector resistor 51. The emitters of transistors 46 and 48 are both connected to terminal 26 via common resistor 50. The collectors of transistors 46 and 48 are connected directly and through collector resistor 51, respectively, to terminal 28. The collector of transistor 48 is also connected to the base of transistor 42 of switching means 3, and the base of transistor 48 is connected to capacitor 24 as shown. Transistor 42 has its emitter and collector connected to terminal 28 and the base of transistor 14, respectively.

The D.C. to D.C. converter of FIGURE 2 operates as follows:

Upon the application of a D.C. input voltage across terminals 26 and 28 of input voltage source 2, the emitter of transistor 14 of blocking oscillator 12 goes positive with respect to the base of this transistor, establishing a base current through bias resistor 58 and thereby causing a collector current to flow through primary winding 16 from the emitter through the collector of transistor 14. At the same time, a voltage is induced in secondary winding 30 from primary winding 16 to sustain the base current and rapidly bring the transistor into saturation. Diode 32 is forward biased when a voltage is induced in secondary winding 30 and is reverse biased during the initial establishment of base current. In the first instance, diode 32 permits current to flow from emitter to base of transistor 14 via secondary winding 30, and in the second instance it permits current to flow from emitter to base of transistor 14 and then to ground via base resistor 58. The collector current of transistor 14 continues to increase with time and charges capacitor 24 via lead 9 until the core of transformer 18 saturates. During the time that transistor 14 conducts, diode 22 of coupling means 5 is reverse biased and does not pass current. The discussion so far presented relates to the operation of the blocking oscillator during the conduction period of transistor 14.

The following discussion relates particularly to the operation of blocking oscillator 12 during the nonconductive period of transistor 14. After saturation of the core of transformer 18, and at such time as there is a flux reversal in the core, the voltage across both primary winding 16 and secondary winding 30 reverse polarity. When this happens, the base current of transistor 14 ceases, thereby cutting off the collector current of transistor 14. Instantaneously, the energy stored in transformer 18 causes current to flow in the closed loop of primary winding 16, lead 9, capacitor 24, diode 22 (forward biased) and lead 10. This allows capacitor 24 to continue to charge until diode 22 becomes reverse biased by the fact that the voltage induced in primary winding 16 drops below the voltage across capacitor 24 as the flux in the core of transformer 18 returns to its quiescent value.

The blocking oscillator continues to operate, as just described, until capacitor 24 charges to a voltage of a predetermined value. This particular voltage value is maintained through the operation of comparator circuit 44 used in conjunction with reference network 8 and switching means 3. A description of how these circuits cooperate will now be presented.

Input voltage source 2 applies a voltage from terminals 26 and 28 thereof across Zener diode 11 and resistor 13 of reference network 8. Zener diode 11, in conjunction with resistor 13, functions to produce a constant voltage which is in turn coupled to the base of transistor 46 of differential amplifier 44 via voltage divider resistors 17, 19. Voltage divider resistors 17, 19 act to establish a reference voltage at the base of transistor 46 of differential amplifier 44. Capacitor 15 of reference network 8 serves to both bypass noise that may appear across Zener diode 11 and filter out transient changes that may appear at input terminals 26 and 28. With the reference voltage established at the base of transistor 46 and an input voltage from input voltage source 2 applied from terminals 26 and 28 thereof across resistor 50 and transistor 46, transistor 46 will normally conduct and act as an emitter follower.

As already mentioned above, in reference to the charging of capacitor 24 by the operation of blocking oscillator 12, there will be a time when the load voltage will tend to increase above a predetermined value. At such time as this condition exists there will be coupled to the base of transistor 48 of differential amplifier 44, from capacitor 24, a voltage sufficiently positive to cause transistor 48 to conduct. Immediately upon conduction of this transistor, transistor 46 will cease to conduct and pass to its nonconductive state by the fact that the potential at its emitter rises above the potential of its base. At the same time, a voltage is developed across collection resistor 51 of transistor 48, which, in turn, is coupled to the base of switching transistor 42. This voltage causes transistor 42 to conduct, thereby clamping the base to the emitter of transistor 14 of blocking oscillator 12 and stopping the oscillation thereof. In this manner, any further rise of the load voltage is prevented.

Now, at such time as the load voltage tends to go below the predetermined value, the signal coupled from the capacitor 24 to the base of transistor 48 causes this transistor to cease conducting. When this happens, transistor 46 is placed in its normal conducting state and switching transistor 42 will cease conducting. With switching transistor 42 no longer conducting, the base to emitter of transistor 14 of blocking oscillator 12 is no longer clamped and the blocking oscillator again starts to oscillate, thereby restoring the charge on capacitor 24.

From the above description, it can be observed that differential amplifier 44, in conjunction with switching means 3 and reference network 8, acts to establish a regulated voltage across load 4 and, at the same time, maximizes the efficiency of the converter by having it only operate at such times as the load voltage drops below a predetermined value. This latter condition is invaluable since it allows the converter to be used in those applications where available power is limited, and thus makes possible the implementation of electronic functions where less efficient converters would preclude these implementations.

The converter of FIGURE 2 was constructed to provide an output voltage of +5 volts from an input voltage in the range of +16 to +21 volts. The core of the transformer measured 0.2 inch in outside diameter (O.D.) and 0.125 inch in thickness and had a maximum flux density of approximately 20 maxwells. With this construction, the converter exhibited an overall efficiency of 54 to 74 percent with a load of 5.2 to 52 milliwatts, respectively. At a constant input voltage of +19 volts the total change in output voltage was .06 percent over a temperature range of −40 to +60 degrees centigrade. Changing the output load power from a negligible value to 52 milliwatts caused the output voltage to vary less than .06 percent.

Figure 3:
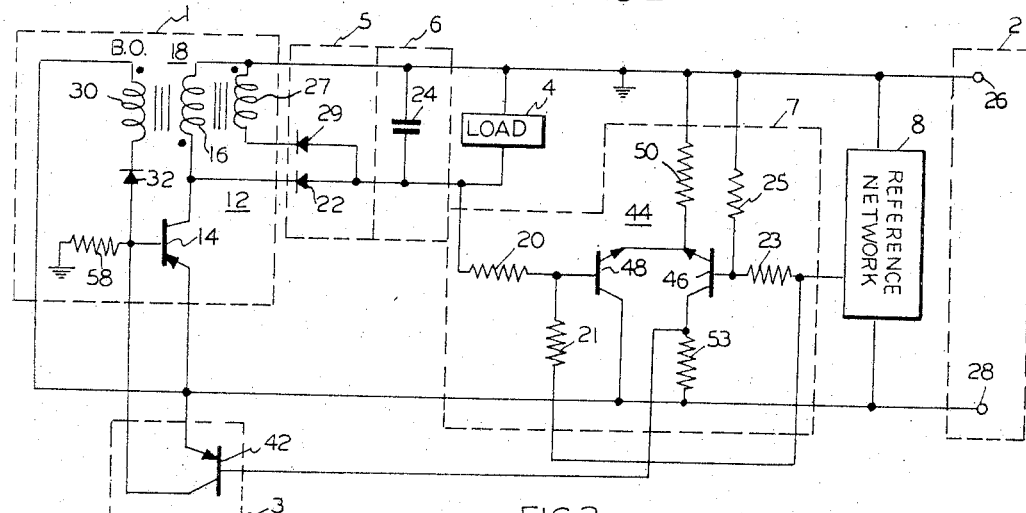

In FIGURE 3, there is shown a circuit similar to FIGURE 2 but arranged somewhat differently so that there is provided a negative voltage to load 4 from positive voltage source 2. A tertiary winding 27 is connected in series with diode 29 across capacitor 24, and primary winding 16 is connected from the collector of transistor 14 to the ground. Differential amplifier 44 is modified in such a way so as to provide the proper phase signal to switching means 3. In this case the collector of transistor 48 is connected directly to terminal 28 while the collector transistor 46 is connected through collector resistor 53 to terminal 28. The output across resistor 53 is then coupled to the base of transistor 42 of switching means 3. Differential amplifier 44 also includes biasing resistors 21, 23, and 25, connected as shown, and coupling resistor 20 connected from load 4 to the base of transistor 48. The remainder of the circuit elements are connected as described in connection with FIGURE 2.

The converter of FIGURE 3 operates as follows:
With no-load voltage and with resistors 21, 23 and 25 appropriately selected, an input voltage across terminals 26, 28 of input voltage source 2 results in a more positive voltage being applied to the base of transistor 48 than to the base of transistor 46 of differential amplifier 44. This causes transistor 48 to be turned on and transistor 46 to be turned off, thereby keeping transistor 42 of switch means 3 open and blocking oscillator transistor 12 functioning essentially as described above in connection with the operation of the converter of FIGURE 2.

During the first part of the operational cycle of blocking oscillator 12, a negative voltage is developed across tertiary winding 27 and diode 29 conducts furnishing current to charge capacitor 24. During the second part of this operational cycle, the voltage reverses across the windings of transformer 18, diode 29 ceases to conduct, and diode 22 conducts to continue the charging of capacitor 24. When the magnitude of voltage across primary winding 16 drops below the load voltage, diode 22 stops conducting and blocking oscillator 12 is in a condition to begin a new operational cycle.

As the voltage across capacitor 24 (load voltage) becomes more negative than a predetermined value, the voltage coupled via coupling resistor 20 to the base of transistor 48 results in the base becoming less positive than the base of transistor 46. This action causes transistor 48 to become nonconductive and transistor 46 to become conductive, turning on switching transistor 42 and clamping off blocking oscillator transistor 14, which, in turn, stops blocking oscillator 12 from further oscillating. Transistor 14 remains cut off until the value of the load voltage becomes less negative than the predetermined voltage value at which time transistor 46 cuts off and the operational cycle of blocking oscillator 12 is again initiated.

Figure 4:
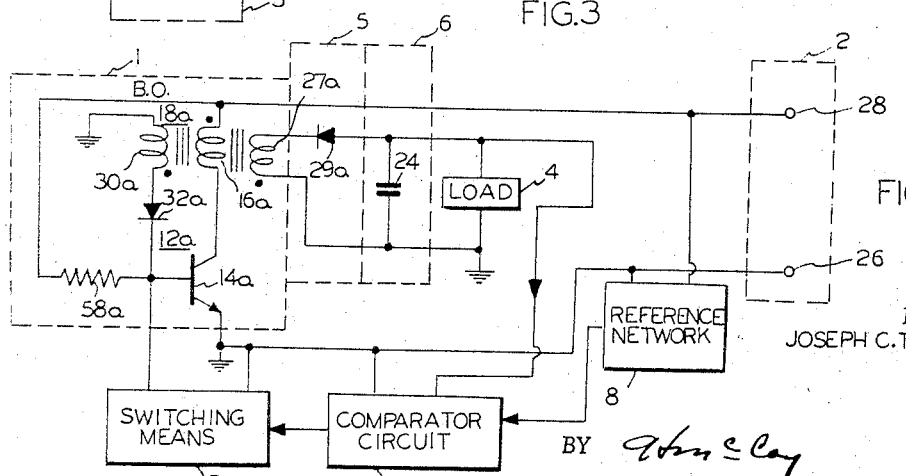
FIGURE 4 is a block diagram, partially in schematic form, of an alternate embodiment of the invention wherein the output voltage is larger than the input voltage.

FIGURE 4 shows a D.C. to D.C. converter for providing a load voltage of negative polarity and of larger magnitude than that furnished by the positive input voltage source 2. This converter is similar to that described in connection with FIGURE 3 with the exception that diode 22, connected between the collector of transistor 14 and load 4, is omitted. In this particular scheme, tertiary winding 27a is conductively isolated from primary winding 16a and connected in series with diode 29a to shunt both capacitor 24 and load 4, and blocking oscillator 12a has its components modified as shown (these being designated with an "a"). While the transistor of blocking oscillator 12a is shown as being an NPN type while that of FIGURES 2 and 3 are shown as being PNP, either type can be used in any of the embodiments just as long as the other circuit parameters are appropriately chosen.

Essentially, the general theory of operation of the converter of FIGURE 3 applies equally as well to the converter of FIGURE 4, with the exception, of course, that consideration must be given to the change in the type of transistors used in blocking oscillator 12a and the isolation of tertiary winding 27a. With transformer 18a constructed so that tertiary winding 27a has many more turns than primary winding 16a, the load voltage available from the converter is greater than that furnished by voltage source 2, this being due to the fact that the load voltage is approximately equal to the turns ratio of tertiary winding 27a to primary winding 16a times the magnitude of the voltage of input voltage source 2.

Figure 5:
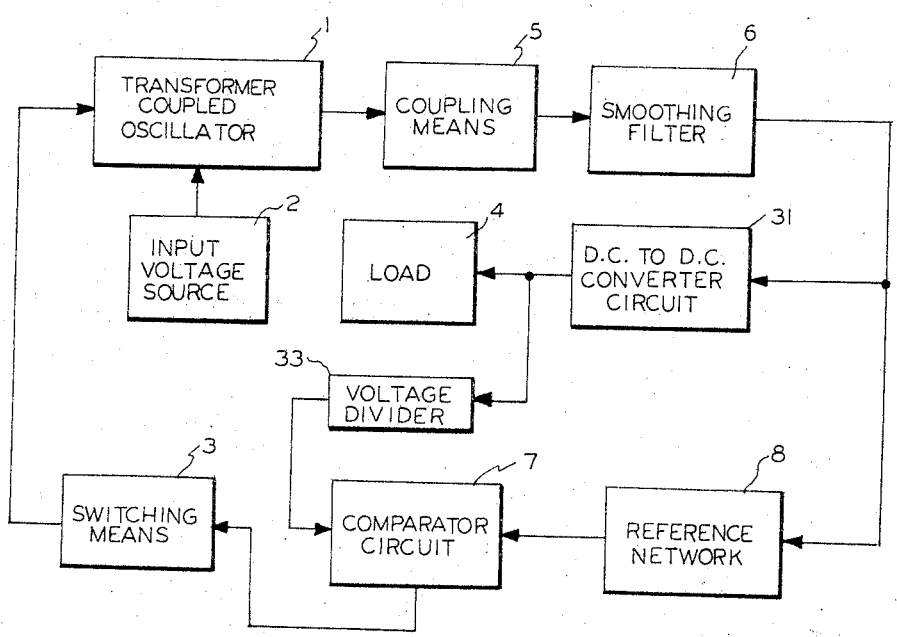
FIGURE 5 is a block diagram of another form of the invention wherein the output voltage is much larger than the input voltage.

The scope of the invention can be expanded as depicted in the embodiment shown in block form in FIGURE 5. There is illustrated a regulated D.C. to D.C. converter in which the load voltage of the system is of much larger magnitude than the input voltage to the system. Input voltage source 2 is connected to transformer-coupled oscillator 1, which, in turn, has its output coupled to D.C. to D.C. converter circuit 31 and reference network 8 via coupling means 5 and smoothing filter 6. The output from D.C. to D.C. converter circuit 31 is applied to both load 4 and to comparator circuit 7, the latter application being via voltage divider 33. Also applied to comparator circuit 7 is the output from reference network 8. Finally, the output from comparator circuit 7 is connected to switching means 3, which, in turn, is connected to transformer-coupled oscillator 1. It might be well to point out that in this configuration D.C. to D.C. converter circuit 31 can be of any of the well-known types of conventional converters and need not be regulated.

Initially, with a voltage from input voltage source 2 being applied to transformer-coupled oscillator 1, there is developed at the output of smoothing filter 6 (as described in detail hereinabove) a substantially D.C. voltage. This voltage is coupled both to D.C. to D.C. converter circuit 31 and to reference network 8. D.C. to D.C. converter circuit 31 acts to provide to load 4 a much larger voltage than would be available directly from smoothing filter 6. In addition, due to the operation of comparator circuit 7, in conjunction with reference network 8, switching means 3, and transformer-coupled oscillator 1, the load voltage is regulated.

Comparator circuit 7 takes the outputs from reference network 8 and D.C. to D.C. converter circuit 31, after it has first been reduced in value by voltage divider 33, and compares them. At such time as the voltage from voltage divider 33 exceeds the value of the voltage from reference network 8, switching circuit 3 is closed thereby preventing further oscillation of transformer-coupled oscillator 1. In this manner, the voltage being applied to load 4 is kept from exceeding a predetermined value. On the other hand, when the voltage applied to comparator circuit 7, from voltage divider 33, is below that from reference network 8, switching means 3 is opened and transformer-coupled oscillator 1 starts to oscillate, keeping the voltage being applied to load 4 from decreasing below the predetermined value.

In the discussion of the embodiments of the invention, depicted in FIGURES 2–4, no mention has been made of the dots illustrated in the figures. They are merely used, in the conventional manner to point out the polarity of the various windings of the transformer.

It might be well to note that a capacitor, while not shown, can be shunted across diode 32 or 32a in FIGURES 3 and 4, respectively, to improve the starting characteristics of blocking oscillator 12, particularly, when the converter is expected to be loaded near its maximum rated load. Also, in the converter of FIGURE 4 a diode (not shown) can be connected between the collector of transistor 14a of blocking oscillator 12a and input terminal 28 of input voltage source 2. The diode connected in this manner will result in recovery by input voltage source 2 of that energy that is available from transformer 18a when the flux of this transformer reverses. In other words, this diode will perform similarly to diode 22 in the converter system of FIGURES 2 and 3, except that current will be furnished to input voltage source 2 rather than to load 4. Both of these diodes tend to increase the efficiency of the entire system.

Although the foregoing disclosure relates to preferred embodiments of the invention, it is obvious to one skilled in the art that numerous modifications and alterations may be made without departing from the spirit and scope of the invention as set forth by the following claims.

What is claimed is:

1. A regulated D.C. to D.C. converter system comprising:
   (a) an output load;
   (b) a transformer-coupled oscillator;
   (c) voltage storage means coupling said transformer-coupled oscillator to said load;
   (d) a reference network;
   (e) an input voltage source directly connected to said transformer-coupled oscillator and to said reference network;
   (f) and, means directly coupling said voltage storage means with said transformer-coupled oscillator for comparing the voltage on said storage means with a voltage derived from said reference network and providing an output signal to control said transformer-coupled oscillator such that a signal therefrom occurs whenever the voltage on said storage means is below a predetermined value and cease at such time as the voltage on said storage means increases above said predetermined value.

2. The converter system of claim 1 wherein said last mentioned means includes:
   (g) comparator circuit means connected to said voltage storage means and said reference network;
   (h) and a switching means connected between said comparator circuit means and said transformer coupled oscillator.

3. The converter system of claim 2 wherein said comparator circuit means includes a differential amplifier and said reference network includes a Zener diode for obtaining a reference voltage for said differential amplifier.

4. The converter system of claim 3 wherein said transformer-coupled oscillator is a blocking oscillator.

5. The converter system of claim 4 wherein said blocking oscillator circuit includes a transformer having a primary winding and said voltage storage means includes a capacitor connected in series with a diode across said primary winding.

6. The converter system of claim 5 wherein said blocking oscillator includes a teriary winding and said voltage storage means includes another diode connected in series with said tertiary winding across said capacitor.

7. The converter system of claim 4 wherein said blocking oscillator includes a tertiary winding, and said voltage storage means includes a diode connected in series with a capacitor and forming a closed loop with said tertiary winding.

8. A regulated D.C. to D.C. converter system comprising an input voltage source, an output voltage storage means, a transformer-coupled oscillator connected to said output storage means and to said input voltage source, a reference network including a Zener diode connected to said input voltage source, and means including a differential amplifier connected between said voltage storage means and said transformer-coupled oscillator for causing said transformer-coupled oscillator to oscillate and charge said storage means whenever the voltage on said storage means is below a predetermined voltage value and for preventing said transformer coupled oscillator from oscillating and thereby stopping further charging of said voltage storage means at such time as the voltage on said storage means increases above said predetermined voltage value.

9. A regulated D.C. to D.C. converter system comprising an input voltage source, a transformer-coupled oscillator connected to said input voltage source, a coupling means connected to said transformer-coupled oscillator, a smoothing filter connected to said coupling means, a load, a D.C. to D.C. converter circuit connected between said load and smoothing filter, a comparator circuit, a reference network connected between said smoothing filter and said comparator circuit, a voltage divider connected between said D.C. to D.C. converter circuit and said comparator circuit, and a switching means connected between said comparator circuit and said transformer-coupled oscillator.

References Cited

UNITED STATES PATENTS

| | | | |
|---|---|---|---|
| 3,310,723 | 3/1967 | Schmidt et al. | 321—2 |
| 3,316,445 | 4/1967 | Ahrons | 321—2 X |
| 3,327,199 | 6/1967 | Gardner et al. | 321—2 |
| 3,337,787 | 8/1967 | Joseph | 321—2 |

OTHER REFERENCES

Electronics, "Ringing Choke Simplifies D-C to D-C Conversion," pp. 90–92, Apr. 18, 1966.

JOHN F. COUCH, *Primary Examiner.*

W. H. BEHA, JR., *Assistant Examiner.*

U.S. Cl. X.R.

321—18; 331—112